Figure 1:
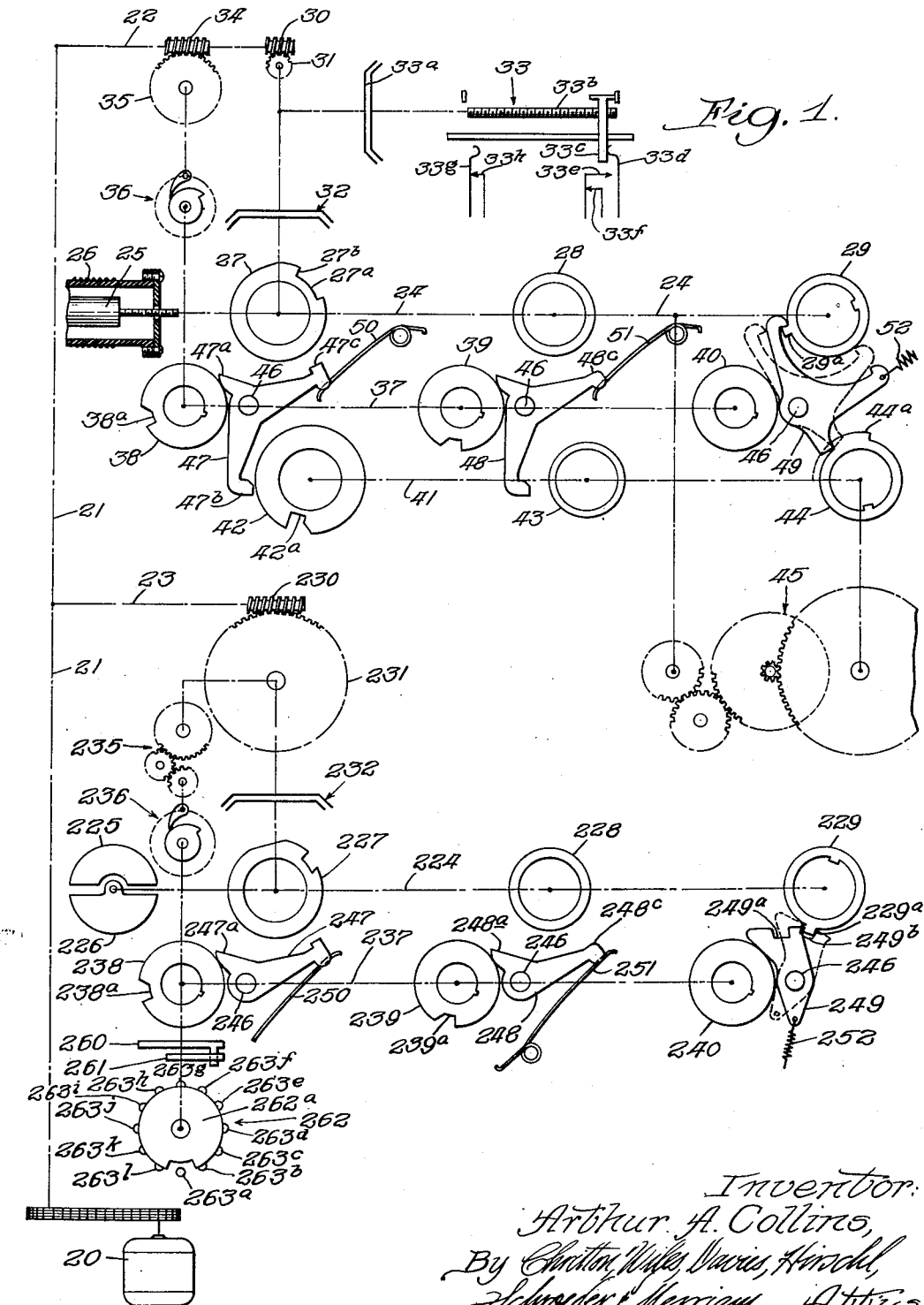

April 3, 1951     A. A. COLLINS     2,546,980
SHAFT POSITIONING APPARATUS
Filed Jan. 18, 1943     9 Sheets-Sheet 2
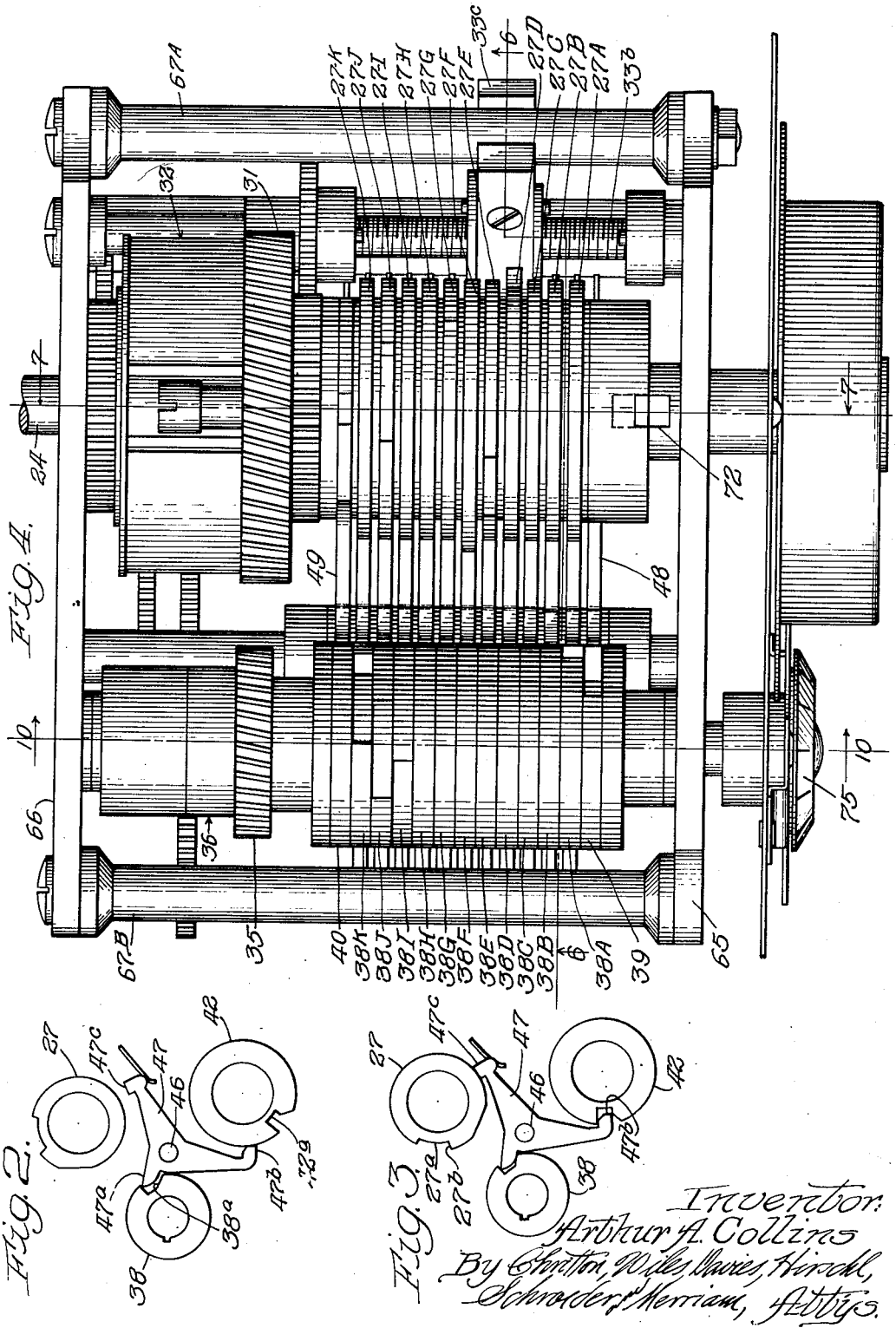

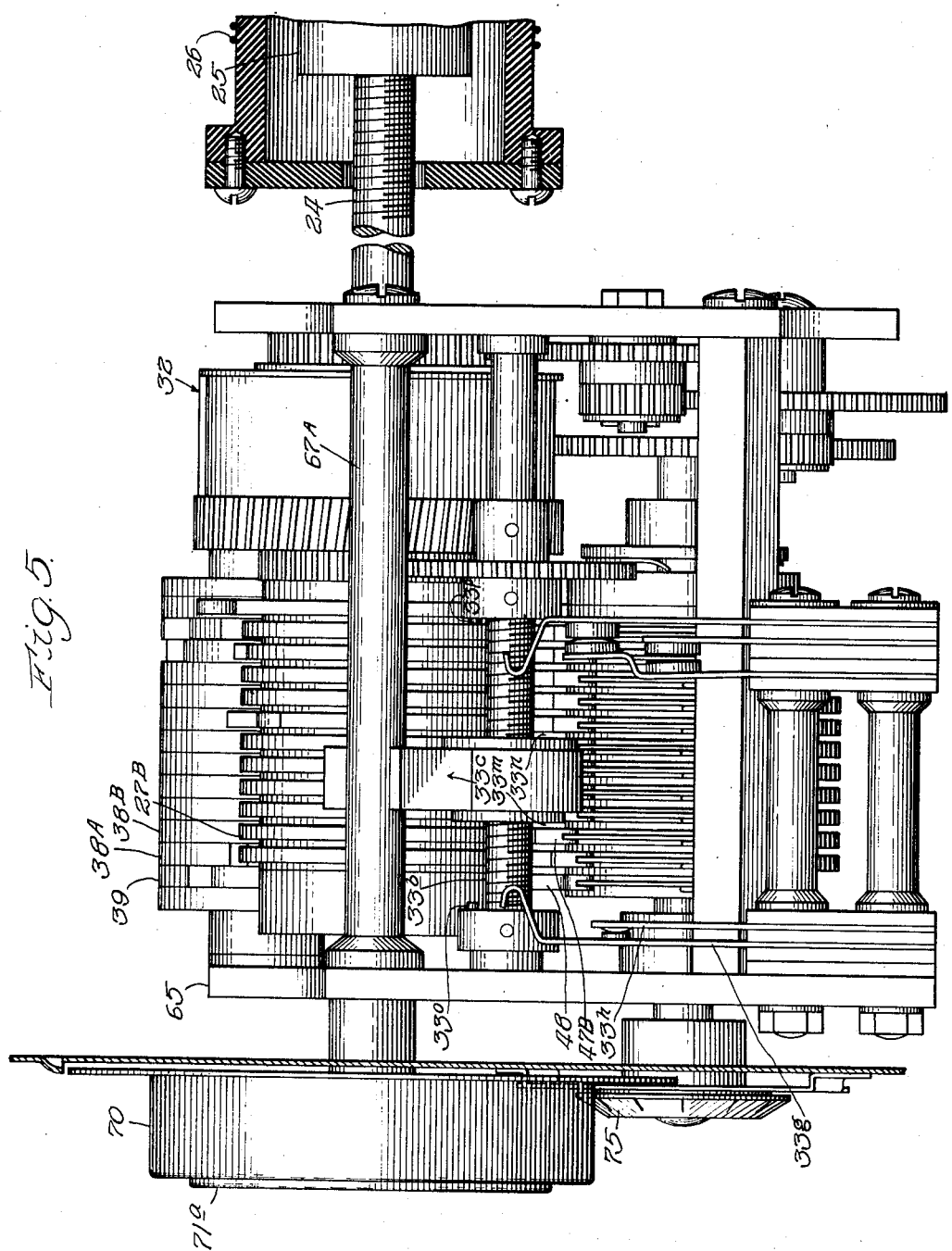

April 3, 1951   A. A. COLLINS   2,546,980
SHAFT POSITIONING APPARATUS
Filed Jan. 18, 1943   9 Sheets-Sheet 4
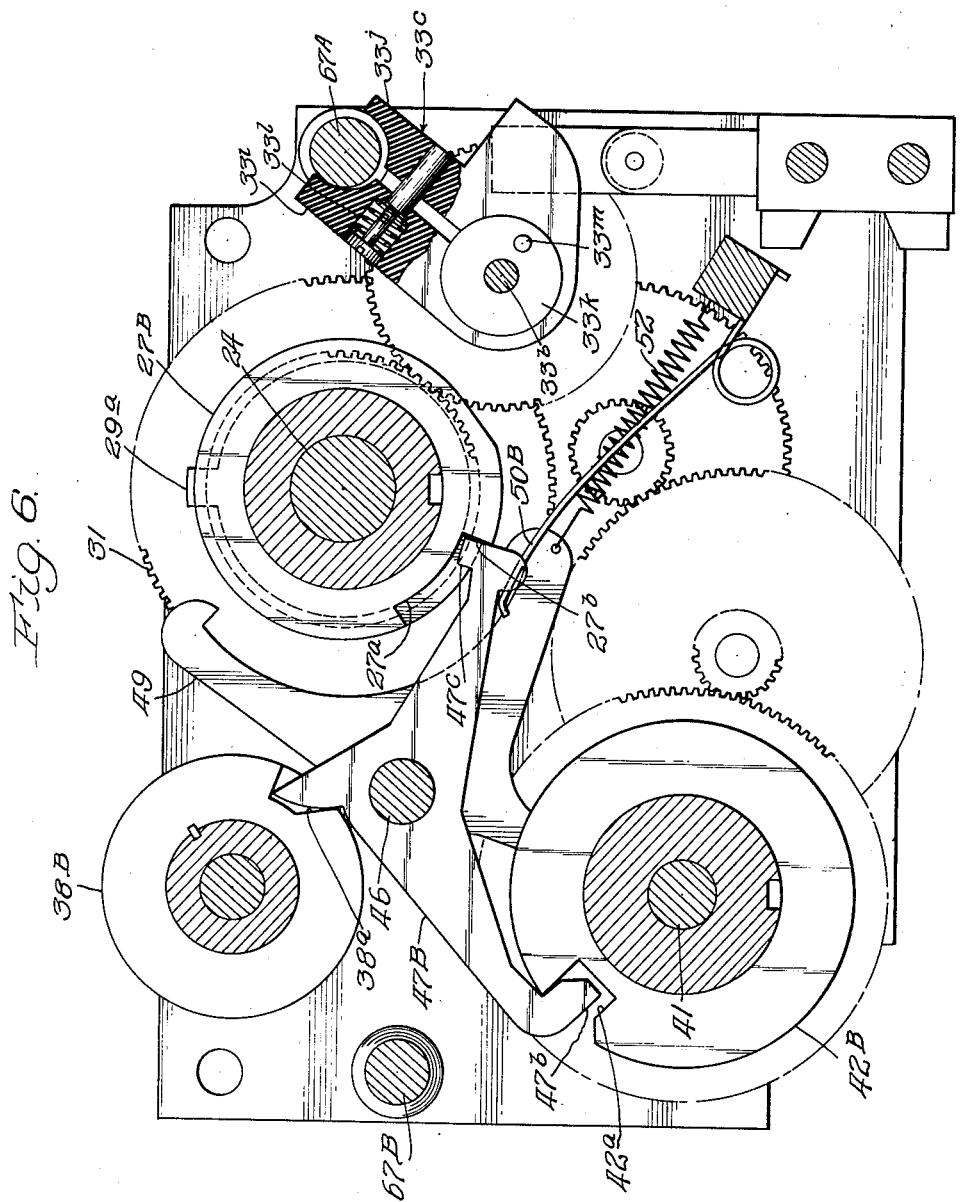
Inventor:
Arthur A. Collins,
By Chritton, Wiles, Davies, Hirschl,
Schroeder & Merriam, Attys.

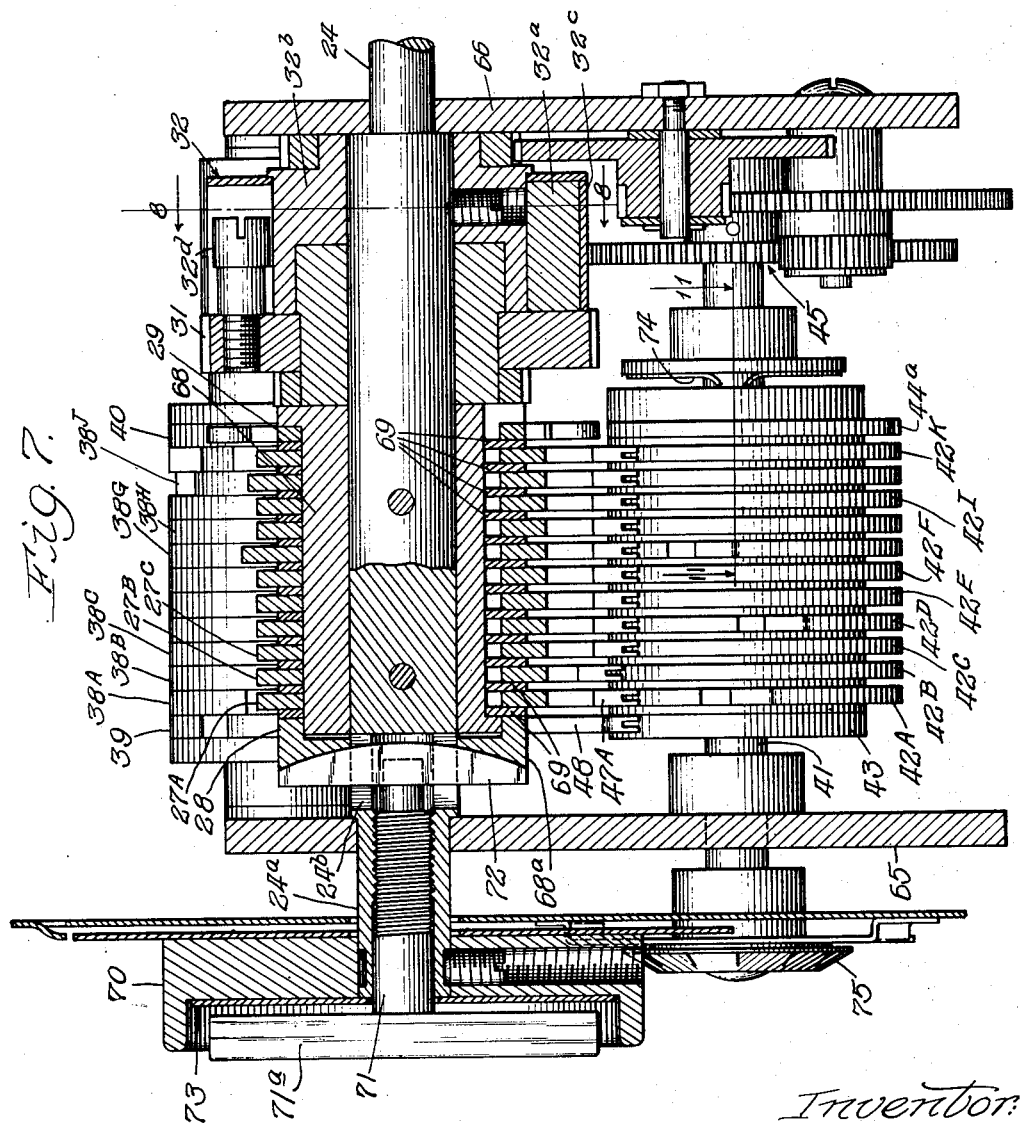

April 3, 1951 A. A. COLLINS 2,546,980
SHAFT POSITIONING APPARATUS
Filed Jan. 18, 1943 9 Sheets-Sheet 6
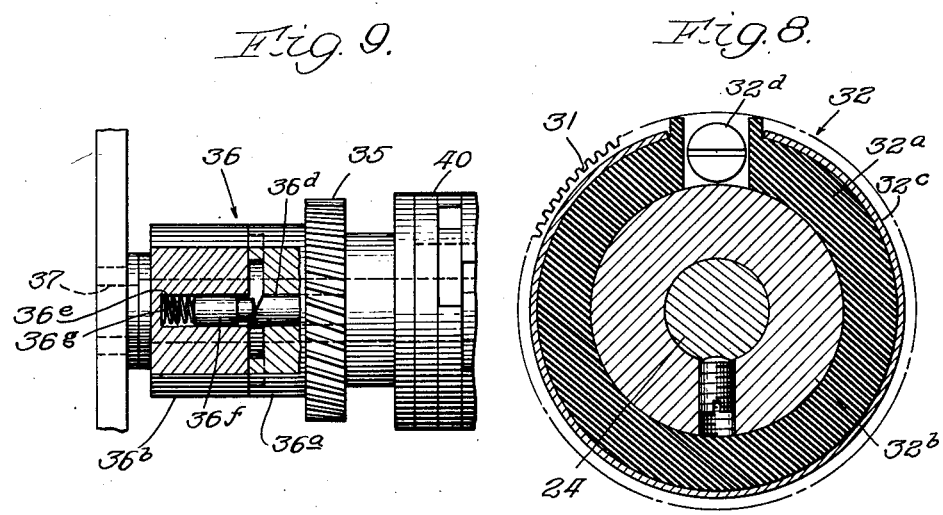
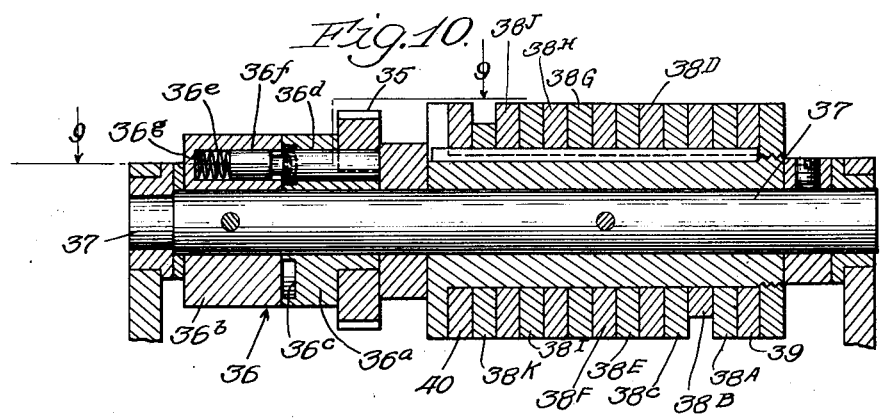
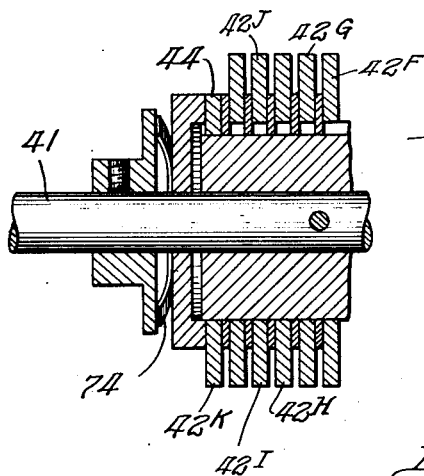

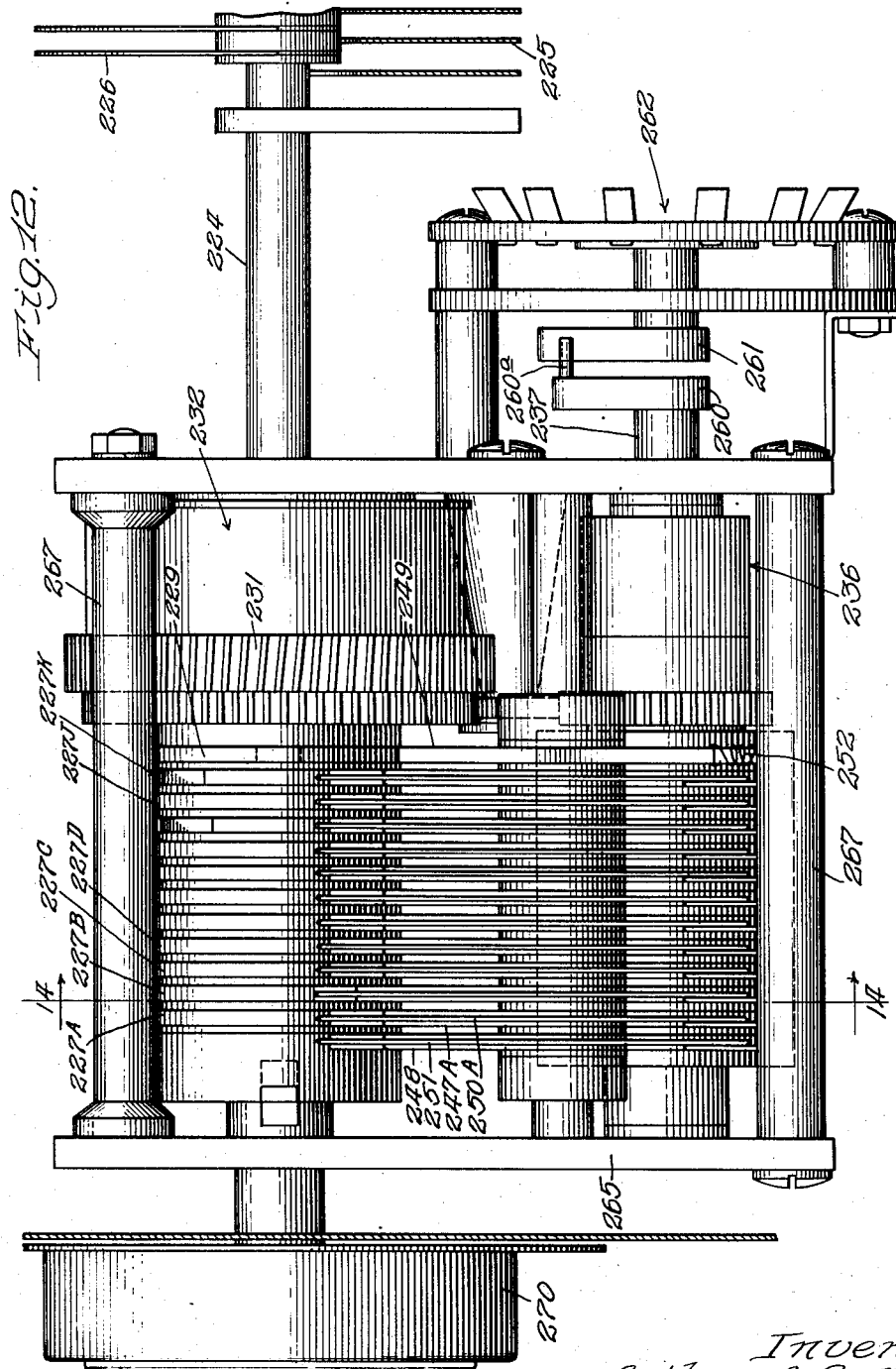

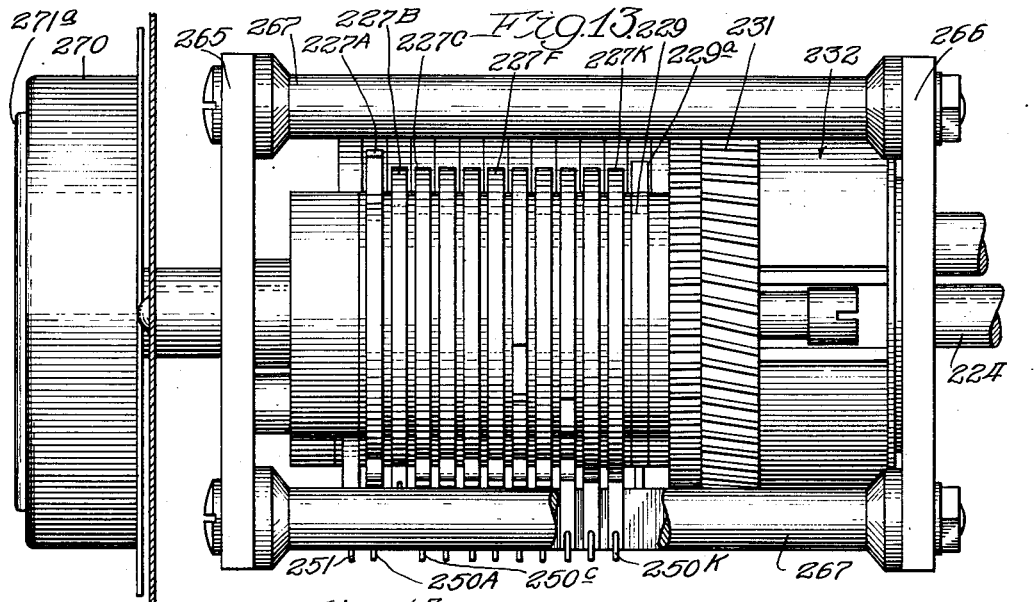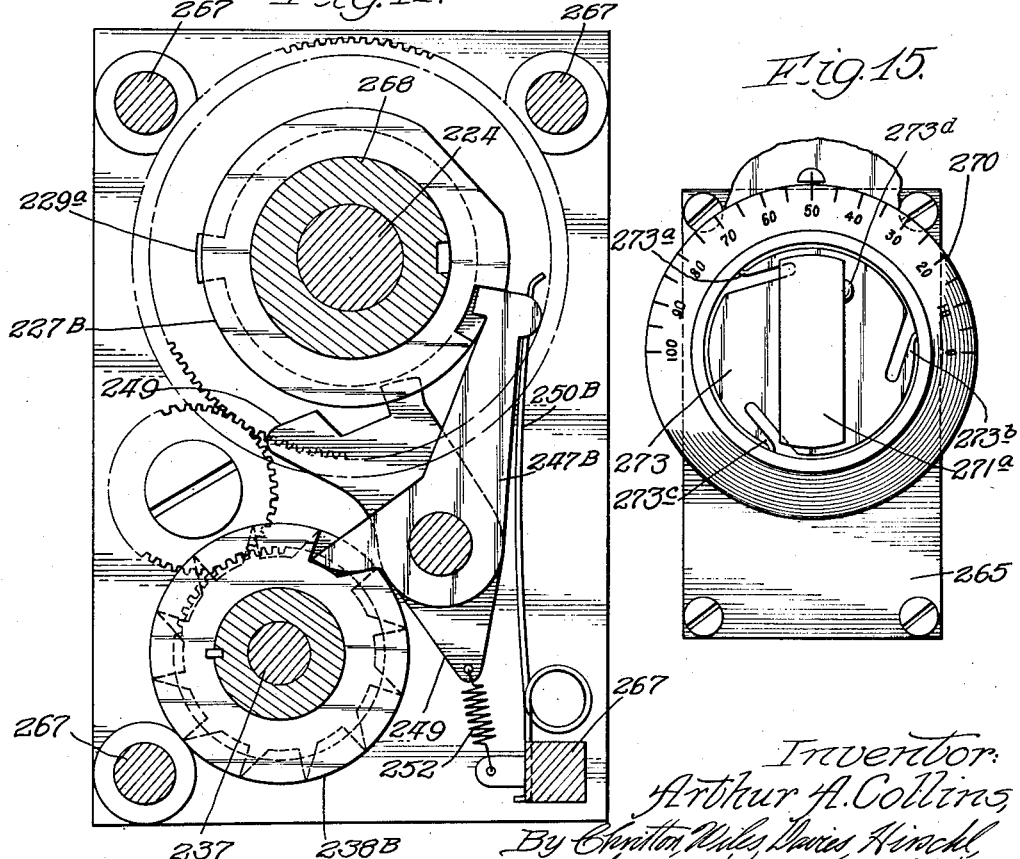

April 3, 1951        A. A. COLLINS        2,546,980
SHAFT POSITIONING APPARATUS
Filed Jan. 18, 1943        9 Sheets-Sheet 9
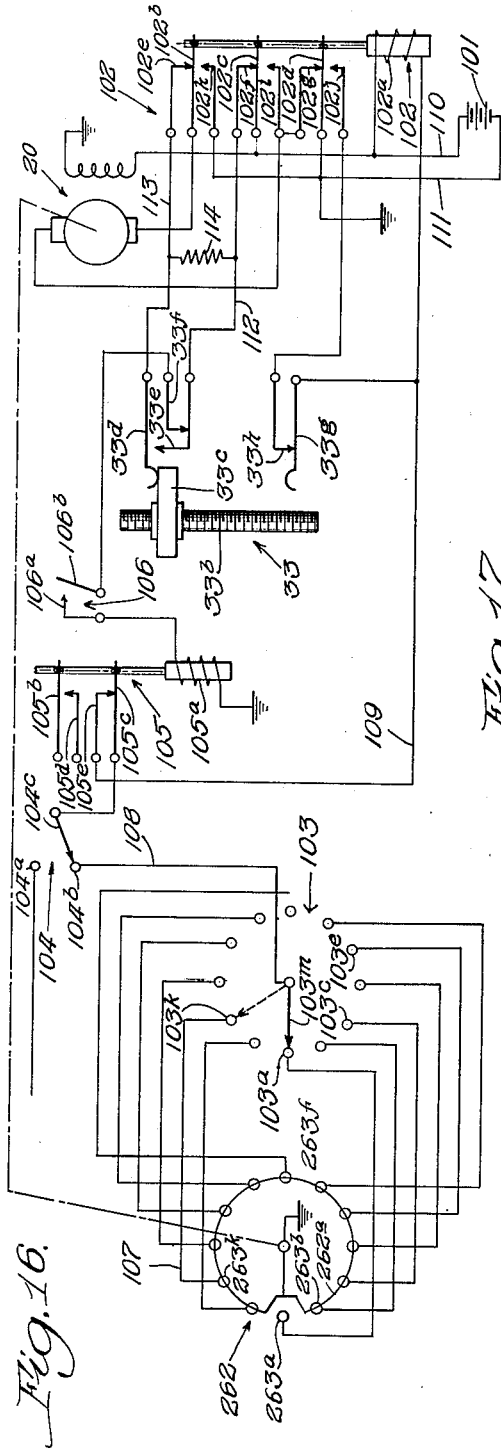
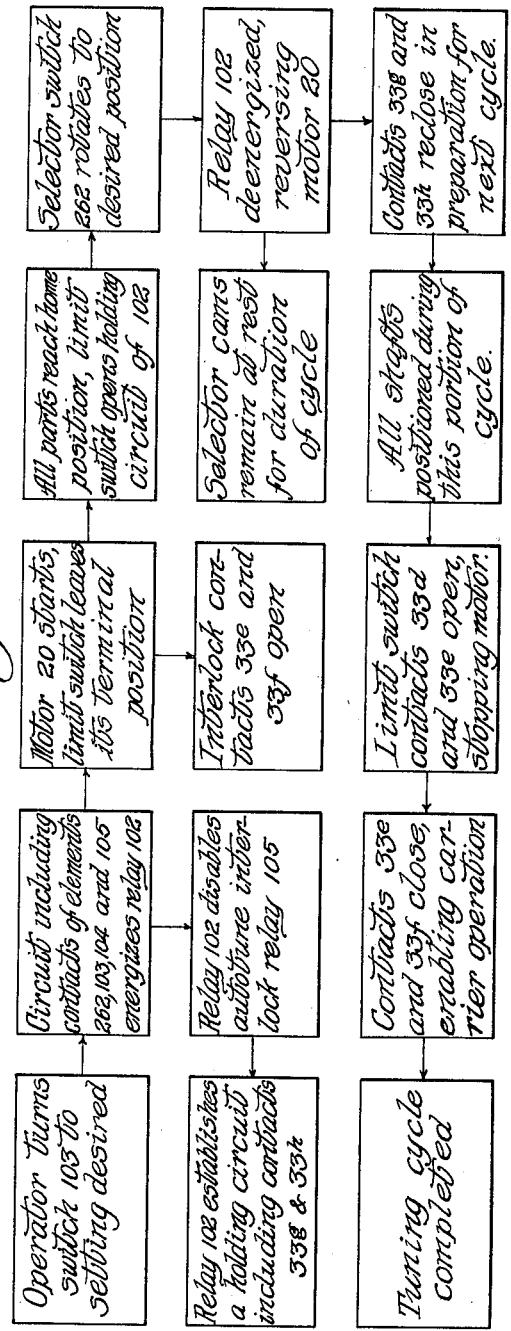
Inventor:
Arthur A. Collins,
By Christon, Wiles, Davies, Hirschl,
Schroeder, Merriam, Attys.

Patented Apr. 3, 1951

2,546,980

UNITED STATES PATENT OFFICE 2,546,980

SHAFT POSITIONING APPARATUS

Arthur A. Collins, Cedar Rapids, Iowa, assignor to Collins Radio Company, a corporation of Iowa Application January 18, 1943, Serial No. 472,717

30 Claims. (Cl. 192—142)

This invention relates to shaft positioning apparatus, and more particularly to means for positioning a shaft at a desired point in any of a plurality of revolutions, to a combination of such means with means for positioning a shaft at a desired point within a single revolution, and to certain detail improvements in such means.

One feature of this invention is that it is adapted to rotate a shaft, as the shaft of a tuned element in a radio set, through a plurality of revolutions and to stop it at a selected desired point in a desired revolution anywhere throughout the range of rotation; another feature is that it provides automatic tuning means of a high degree of accuracy adapted to actuate a tuned element, in a radio transmitter or receiver, for example, having a shaft continuously rotatable through a plurality of revolutions; still another feature of this invention is the provision of a plurality of units adapted to simultaneously and automatically position a plurality of shafts in a predetermined relationship, some of said shafts being rotatable only through an arc not exceeding one revolution, but at least one being rotatable continuously through a plurality of revolutions, a single control operation effecting different angular movements of different shafts; yet another feature is the arrangement whereby a plurality of position selecting means in various units are automatically synchronized, during each cycle of operation, with a single selector switch; a further feature is the provision of means enabling convenient manual setting or pre-selection of the desired point to which a shaft is to be automatically positioned without access to the interior of the positioning unit, as from the front of the panel of a radio set; still a further feature of this invention is that it provides means for positively lifting a pawl out of a cooperating slot upon initiation of a cycle of operation, whereby manual setting or pre-selection of a desired point is facilitated; yet a further feature is an arrangement whereby one setting of the automatic positioning means frees the shaft of each tuned element to permit manual tuning of the element; and other features and advantages of this invention will be apparent from the following specification and drawings, in which:

Figure 1 is a schematic diagram of apparatus embodying my invention, with the parts at one terminal position; Figure 2 is a schematic diagram of one portion of the apparatus shown in Figure 1, but in a different position; Figure 3 is a partial schematic diagram similar to Figure 2, but with the parts in still another position; Figure 4 is a plan view of a shaft positioning unit adapted to position a shaft at any desired point through out a range of a plurality of revolutions, hereafter termed a "multi-turn" unit; Figure 5 is a side elevation of the multi-turn unit with a fragmentary sectional portion of a slug-tuned coil associated therewith; Figure 6 is a sectional view along the line 6—6 of Figure 4; Figure 7 is a sectional view at right angles to that of Figure 6, along the line 7—7 of Figure 4, the pawl springs being omitted for clarity; Figure 8 is a detailed transverse sectional view of the slip-clutch, along the line 8—8 of Figure 7; Figure 9 is a fragmentary sectional view of the ratchet assembly, along the line 9—9 of Figure 10; Figure 10 is a sectional view of part of the selector mechanism, along the line 10—10 of Figure 4; Figure 11 is a fragmentary detail sectional view of part of the secondary cam mechanism, along the line 11—11 of Figure 7; Figure 12 is a side elevation of a unit adapted to position a shaft at any desired point within a single revolution, hereinafter termed a "single-turn" unit; Figure 13 is a plan view of the unit shown in Figure 12; Figure 14 is a transverse sectional view along the line 14—14 of Figure 12; Figure 15 is a front view of the single-turn unit; Figure 16 is a wiring diagram of this particular embodiment of my invention; and Figure 17 is a block diagram illustrative of the sequence of operations during a cycle of operation.

The shaft positioning apparatus disclosed herewith is an improvement on apparatus which I have heretofore developed embodying the same basic idea, mechanical positioning of the shaft of a tuned element as the result of automatic operation initiated by movement of a control switch. Apparatus of this general type has been the subject of many patents heretofore issued to me, one of the more recent of these patents being No. 2,285,414, issued June 9, 1942.

All of the automatic tuning arrangements which I have heretofore developed and disclosed, however, have been designed for and are operable only in connection with a shaft designed to be rotated through an arc not exceeding one revolution, and this has proved highly satisfactory for automatic positioning of tuned elements such as the conventional condenser, tap switch, variometer, and the like. Certain elements of a radio set, however, require continuous rotation of the tuned element shaft through a plurality of revolutions, and this has never heretofore been possible with my apparatus. Examples of this are slug tuning of a coil, for example, where a core slug is moved in or out of a coil to vary its inductance by rotation of a threaded lead screw, which may rotate through twenty turns to vary the inductance from minimum to maximum; or certain types of condensers, carbon pile resistors, and the like which are driven by lead screws.

I have now developed and am here disclosing and claiming a multi-turn shaft positioning unit and associated operative mechanism capable of rotating the shaft of a tuned element continuously through any number of desired revolutions, and stopping it with a high degree of accuracy at any desired point throughout the entire range of movement. This greatly expands the field of usefulness of my automatic tuning systems, multi-turn and single-turn units being useable in combination with each other. In addition, I have made certain improvements in the parts, details, and sequence of operations which are also applicable to single-turn units, and for that reason am also disclosing such a unit here.

A transmitter embodying my automatic tuning arrangement would be provided with one or more line shafts driven by a reversible motor, each shaft in turn driving, through appropriate gearing, one or more single-turn or multi-turn units, or both, these units positioning the shafts of a combination of tuned elements in positions appropriate to a given number of pre-selected frequencies. An aircraft field transmitter, for example, might be provided with a main shaft extending up one side of the cabinet and with two or three cross shafts or line shafts arranged horizontally at different levels and driven in synchronization from the main shaft by appropriate gearing. One such line shaft might drive a multi-turn unit providing slug tuning, through twenty turns, of the oscillator coil; a single turn unit providing tuning of a conventional transmitting condenser only requiring rotation of its shaft through a range of 180°; and a single-turn unit rotating the switch arm of a tap switch through approximately a full 360°. The other line shaft might drive a similar row of multi-turn or single-turn units providing appropriate positioning of other circuit elements, as resistors, variometers, other condensers or tap switches, etc. For simplicity of explanation only one multi-turn unit and one single-turn unit are illustrated and described, although a number of such units would normally be used. Figure 1 is the principal schematic diagram, and a general explanation of the apparatus will first be made with the use of this diagram; Figures 2 and 3 are subsidiary schematic diagrams; Figures 16 and 17 are general circuit and sequence diagrams; Figures 4-11, inclusive, are structural drawings of a multi-turn unit; and Figures 12-15, inclusive, are structural drawings of a single-turn unit.

In the particular embodiment of my invention illustrated herewith, and referring now more particularly to Figure 1, a reversible electric motor 20 drives a main shaft 21 which in turn drives cross shafts or line shafts 22 and 23, the line shaft 22 being illustrated as driving a multi-turn unit and the shaft 23 as driving a single-turn unit. That is, the upper portion of Figure 1 schematically illustrates a multi-turn shaft positioning unit, while the low portion of Figure 1 provides a similar illustration in connection with a single-turn unit.

Referring now more particularly to the multi-turn unit illustrated in the upper portion of Figure 1, this unit is shown as having a rotatable shaft 24 which operates through a lead screw arrangement to move a core member or slug 25 axially of a coil 26, this slug being splined to permit axial but prevent rotational movement in conventional manner (not illustrated here, since it forms no part of the present invention). Mounted on a drum on the shaft 24 in a manner to be hereafter more fully described (normally non-rotatable with respect to the shaft) are a plurality of tuning stop rings 27, a manual stop ring 28 (which may be part of the stop ring mounting drum), and a terminal stop ring 29. While all of these are non-rotatably locked to the shaft 24 during operation, the tuning stop rings 27 may be unlocked to permit setting or pre-selection of the point at which the shaft is to stop. A worm 30 on the line shaft 22 drives a worm gear 31 (as at a 12½ to 1 ratio, for example), the worm gear driving one of the two elements of a slip-clutch 32, the other element of this clutch being connected to and driving the shaft 24.

The worm gear 31 also drives a limit switch, here indicated in general as 33, through a slip-clutch arrangement indicated as 33a. A threaded shaft 33b carries an operating arm 33c, this being shown in the terminal position of a cycle of operation, with the movable contact 33d out of engagement with the contact 33e. Upon initiation of a cycle of operation by manipulation of the selector switch to call for a new frequency setting, the operating arm 33c travels to the left (33d first engaging 33e and moving it out of engagement with 33f) until contact between 33g and 33h is broken, the motor thereafter reversing as will be more fully described later in connection with the circuit diagram (Figure 16), whereupon the limit switch arm reverses and travels back to its terminal position shown in Figure 1 of the drawings.

Another worm 34 on the line shaft 22 drives a worm gear 35 (as at a 40 to 1 ratio), this in turn acting through a single-tooth ratchet, here indicated in general as 36, to drive (in one direction only) a shaft 37. This shaft has non-rotatably mounted thereon a plurality of tuning selector cams 38, a manual selector cam 39, and a terminal stop ring 40 (which may be part of the cam drum). Another shaft 41 carries a plurality of secondary or turn determining cams 42, a secondary manual cam 43, and a terminal stop cam 44. This latter cam is immovably mounted on the shaft 41, but the secondary cams are mounted with a frictional retention such that they normally move with the shaft, but can slip if the frictional force is exceeded. The shaft 41 is driven from the shaft 24 in fixed relation thereto by gearing, here indicated in general as 45, appropriate to the number of turns for which the unit is designed, as for example with a gear ratio of 23⅓ to 1.

A stud 46 provides a mounting for a plurality of automatic tuning pawls 47, a manual tuning pawl 48, and a terminal stop pawl 49. The pawls 47 and 48 are biased in one direction by the rod springs 50 and 51, while the terminal stop pawl 49 is normally biased to a position intermediate the full line and dotted line positions by a coil spring 52.

Referring first to the terminal position pawl, all of the parts are shown at one terminal, where they would be if the manual tuning combination had been selected and a cycle of operation had been gone through with no automatic tuning. Upon operation of the control switch to call for automatic tuning to a pre-determined position, the shaft 24 and the ring 29 would begin counterclockwise rotation, (speaking with respect to Figure 1) while the ring 44 would begin a corresponding clockwise rotation at a greatly reduced rate. As soon as this latter ring moved a few degrees the terminal stop pawl 49 would be permitted to assume an intermediate position under the influence of the spring 52, and the shaft 24 would be free to rotate through a desired number of revolutions (as a little over twenty revolutions) until the shoulder 44a had come around to its dotted line position and forced the terminal stop pawl 49 to its dotted line position, whereupon the shoulder 29a would engage one of the ends of this stop pawl and stop the tuned shaft at its other terminal position, hereafter designated the "home" position. Then as soon as the sequence of operations effected reversal of the motor 20 the shaft 24 and its associated rings would begin to rotate in the reverse or clockwise direction, being free to rotate in this direction until stopped by one of the tuning stop combinations or by the terminal stop arrangement as illustrated in solid lines.

When automatic tuning is effected by the sequence of operations to be hereafter more fully described, one step is the selection of the tuning pawl 47 which is to be rendered operative. This is accomplished by rotating the selector cam drum until the slot 38a lies immediately under the portion 47a of the pawl, the pawl then moving slightly (under the influence of the spring 50) until the end 47b drops down onto the periphery of the secondary cam 42, this position of the parts being shown in Figure 2. It is apparent that the pawl 47 is unable to move further until the slot 42a in the secondary or turn-determining cam 42 is opposite the end 47b (the parts 27 and 42 rotate after pawl selection has been made and the selector cam drum has stopped). When this registration does occur, as illustrated in Figure 3, the pawl moves further about its mounting stud 46, dropping down until its end 47c rests on the periphery of the stop ring 27. The stop ring then continues rotation (in a clockwise direction, speaking with respect to these views) until the end 47c of the pawl drops into the slot 27a and strikes what may be termed the forward shoulder 27b of this slot, this situation being illustrated in Figure 6. This stops rotation of the shaft 24 although, because of slippage in the clutch 32, the line shafts and other units may continue until the cycle of operation is terminated.

It will thus be seen that a desired number of automatic stop combinations may be provided, each being a duplicate of the combination just described. Each such combination includes means for selecting that combination, one of the selector cams; means for determining in which turn or revolution of the shaft 24 the pawl will be permitted to move into operative relationship with the stop ring 27, this means comprising the secondary cam 42; and means for stopping the shaft of the tuned element at a desired point in the chosen revolution, this being effected by engagement of the end of the pawl with the forward shoulder of the slot of the stop ring 27. The shafts 24 and 41, and thus the stop rings and secondary cams, are maintained in synchronization and moved in appropriate ratios to each other by the interconnecting gear train 45, so that whenever a given stop combination is selected the shaft of the tuned element will be stopped very accurately and precisely at the chosen point in the chosen revolution, which point may be anywhere through the full range of continuous rotation of the shaft 24.

While the full sequence of operations of an automatic tuning cycle will be explained in detail later in connection with the description of the various switches and relays effecting such sequence, it is believed that understanding of the present invention will be facilitated by a brief description of a tuning operation at this time. When it is desired to change the transmitter to a different predetermined frequency the operator turns a control switch to the corresponding setting, whereupon the motor 20 starts to rotate in a direction moving all of the parts toward home position. The motor rotates through a predetermined number of turns determined by the limit switch, various tuned shafts reaching home position at various times (depending on their previous positions) and their respective clutches thereafter slipping. When this portion of the cycle is completed the motor continues operation in the same direction ("beyond home," as it might be termed) being stopped somewhere during this additional rotation by an automatic selector switch, stoppage of the motor occurring when the selector cam arrangements are in such position as to actuate the desired stop combination, the one corresponding to the control switch setting. Thereupon the motor reverses and drives the parts in the tuning direction (but without disturbing the selector cams), the various units rotating in this direction until each tuned shaft is stopped by the selected pawl at a position appropriate to the frequency desired, the respective clutches thereafter slipping until the motor and line shafts have completed the full cycle and have been stopped by the limit switch.

Referring now more particularly to the single-turn unit illustrated schematically in the lower portion of Figure 1 it will be seen that a worm 230 drives a worm gear 231 at an appropriate ratio (as for example 80–1), this operating through a slip clutch identified in general as 232 to rotate the shaft 224 which actuates the tuned element, here shown as a conventional condenser comprising stationary plates 225 and rotatable plates 226, these latter being carried by and movable with the shaft 224. This shaft has mounted upon it (immovably so except when set-up or adjustment is being made) a plurality of tuning stop rings 227, a manual tuning ring 228, and a terminal stop ring 229, the latter being keyed to the drum carrying the rings.

The worm gear 231 also drives, through a train of gears here indicated in general as 235 (which may have a 1–2 ratio, for example), one element of a single tooth ratchet indicated in general as 236, the other element of this ratchet driving (in one direction only) a shaft or drum 237. This latter element carries a plurality of tuning selector cams 238, a manual selector cam 239, and a terminal stop backing ring 240. A pawl shaft or stud 246 carries a plurality of tuning pawls 247, a manual operation pawl 248, and a terminal stop pawl 249. The pawls 247 and 248 are urged counterclockwise (speaking with respect to the position of the parts in this figure) by rod springs 250 and 251, and the terminal stop pawl 249 is normally urged or biased to a position intermediate the positions shown in full and dotted lines by a spring 252. The terminal stop wall 249 is provided with a slot 249a and a shoulder 249b, and cooperates with the projection 229a to enable a full 360 degrees of rotation between terminal positions. While this is not necessary in connection with the conventional condenser illustrated, it is desirable in connection with certain other tuned units. In the terminal position illustrated in full lines the projection 229a bears against the pawl shoulder 249b, the other side of the pawl 249 bearing against the backing ring 249; in the other terminal (home) position, shown in dotted lines, the projection 229a enters the slot 249a and the pawl strikes a portion of the ring 229 to prevent further movement in this direction.

The shaft 237 also rotates, through a lost motion connection comprising the parts 260 and 261, the rotatable portion 262a of an automatic selector switch 262 having a plurality of fixed contacts 263a—l. Only one of the units (here shown as the multi-turn unit) has a limit switch 33 associated with it; and only one of the units (here shown as the single-turn unit) has a selector switch associated with it. All of the selector cam assemblies in the various units, however, must rotate in synchronization and proper registration with the selector switch 262, and this is accomplished by appropriate gearing and by the use of the single-tooth ratchets. It will be noted that there are no slip-clutches in the drives for the selector cam arrangements; and that the driving elements of the single-tooth ratchets 36 and 236 rotate at the same speed (the differences in the initial drive ratios in the multi-turn and single-turn units is compensated for by the gearing train 235) and is fixed relation to each other, being locked in this relation by the interconnection through the main and line shafts. Since the ratchets 36 and 236 are of the single tooth variety, the structural details of which will be described later, the selector cam arrangements, upon the initiation of each cycle of operation, assume the desired relation with each other and then rotate together until they are stopped to make corresponding selections of stop combinations in all of the various tuning units.

The purpose of the lost motion connection comprising the parts 260 and 261 is to enable the selector cams 238 to back off or shift position slightly (generally less than 10°), as the portion 247a drops into the slot 238a (as was illustrated more fully in Figures 2 and 3 in connection with the multi-turn unit) without disturbing the setting of the rotatable portion of the selector switch 262. This is necessary, since selection of the particular stop combination to be operative is determined by opening of the circuit to a particular switch tap (as 263a), and any movement of the rotatable switch member which would cause one of the edges of its slot to again contact this switch point would cause undesired interference with the cycle of operations.

Selector cams and pawls are provided to free all of the shafts of the tuned elements for manual manipulation. It would seem unnecessary to have a selector cam and pawl for this purpose, since one could merely omit actuation of one of the automatic tuning stop combinations. However, it is always desirable to fixedly position the selecting mechanism upon each cycle of operation, to prevent one of the selector cam arrangements (free to rotate in one direction because of the ratchet connection) from being accidentally rotated (as by vibration) to a position bringing one of the automatic stop combinations into operation when it is desired that the shaft remain free for manual tuning. The provision of a manual selector cam 239 and cooperating pawl 248 in the multi-turn unit and a similar cam 39 and pawl 48 in the single turn unit prevents any difficulty in this regard, since when manual tuning is selected movement of the portion 248a of the pawl into the slot 239a in the manual selector cam and similar movement in the multi-turn unit locks the selector arrangements against rotation so that vibration will not accidentally bring a tuning stop combination into operation. When the manual arrangement is actuated there is no hinderance to manual rotation of the respective shafts 24 and 224 as there is no projection on the outer ends 48c and 248c of the respective manual pawls, and each of said pawls cooperates with a smooth ring 28 and 228 respectively.

In order to more fully described the structural details of the multi-turn unit, reference will now be had more particularly to Figures 4–11, inclusive. It will be seen that the parts are arranged in a self-contained unit mounted between the plates 65 and 66 held in appropriate relationship to each other by posts 67. The tuned shaft 24 has fixedly mounted thereon a drum 68, this drum having a longitudinally but non-rotatably movable forward portion 68a. The drum carries the desired number (here eleven) of tuning stop rings 27A—K and the terminal stop ring 29, these being separated by spacer rings 69 (see Figure 7), these latter being keyed to the drum. The forward portion 24a of the shaft 24 carries the tuning dial 70 and is internally threaded to receive a locking stud 71 with a manual grip or bar portion 71a mounted in an appropriate recess in the front of the dial 70. The inner end of the stud is received by a recess in a pressure member 72 which is longitudinally but non-rotatably movable in a slot 24b in the shaft 24. Inward movement of the locking stud 71 transmits pressure through the member 72 and the movable end 68a of the drum to lock the stop rings 27 fixedly in position; while outward movement of the stud 71 releases this pressure and enables the stop rings to be slipped around on the drum to change the setting. Movement of one stop ring does not disturb the setting of the others because of the keyed spacing washers between them.

The bottom of the recess in the dial 70 is provided with a retention plate 73 to prevent removal of the locking stud. A front view of this plate is shown in Figure 15 in connection with the single-turn unit (the arrangements being identical in this regard), where it will be seen that the plate is provided with three tongue portions 273a—c which bite into the dial material (as a plastic or hard rubber) to permit clockwise but prevent counterclockwise movement of this plate. The plate is also provided with a stop member or portion 273d which projects up into the path of the gripping bar, so that it can only be released a half turn, sufficient to enable resetting of the stop rings, but cannot be completely removed. Any wear in the parts is taken up by clockwise movement of the plate when the stud is drawn up tight again.

As may be best seen in Figure 7, the secondary cams 42A—K are also mounted on a drum on the shaft 41, with spacing rings between them, the arrangement being similar to that of the stop rings except that the secondary cams are held in position by a spring 74 rather than by a locking stud. This spring provides sufficient tension to hold the secondary cams in fixed position for all operative purposes, yet enables them to be forceably moved with respect to the drum when desired. In order to prevent unintended movement of these rings the end 47b of the pawl and the slot 42a in the secondary cam are provided with appropriate sloping portions. Any partial accidental dropping of this pawl end into the slot 42a during operation of the mechanism (and more particularly during rotation of the selector cams prior to selection) thus does not disturb the setting, since the pawl rides right out again. The shaft 41 carries a secondary indicating or counter dial 75 providing an indication of the number of turns through which the tuned shaft 24 has been rotated.

With the arrangement thus shown and described automatic tuning set-ups can be changed very simply and easily from the front of the radio set, without any tools and without the necessity of access to the interior of the set or of the units. In order to change a setting it is only necessary to make a selection of that particular setting, so that the appropriate pawl 47 moves into the appropriate slots in the secondary cam and stop ring associated with it, as shown in Figure 6; then to loosen the locking stud by giving it a half rotation counterclockwise. The shaft 24 may then be manually turned to the new position, initial movement in either direction being possible because there are both forward and back shoulders on both the stop rings and secondary cam slots, it only being necessary to make the final movement in such direction that the end 47c of the pawl is in engagement with the forward shoulder 27b of the stop ring. The dial is then held in this position with one hand and the locking stud tightened, whereupon actuation of that particular stop combination will always bring the tuning shaft back to the position chosen.

Movement of the secondary cams to the proper position is automatic during this set-up operation, since the particular secondary cam being changed is held in proper relation to the end 47b of the pawl, slipping on its drum as the shaft 41 is rotated through the gear train 45 by rotation of the shaft 24. In order to enable the setting to be accomplished automatically in this way some provision must be made for positively lifting the pawl end 47b out of the secondary cam slot 42a when another tuning cycle is being initiated, and this is accomplished by the sloping portion of the slot 38a in the selector cam. Initiation of the next cycle of operation causes rotation (through the ratchet arrangement 36) of the secondary cam in a counterclockwise direction, and this positively lifts the ends 47b and 47c out of the slots in the secondary cam and stop rings. Because of the additional cams on the secondary cam drum (which moves very slowly), the slot 27a in the stop ring in the multi-turn unit is wider than that in the single-turn unit.

Turning now more particularly to Figures 5 and 6, it will be seen that the movable member 33c of the limit switch comprises a split portion with two parts 33i and 33j encircling and gripping a slip clutch member 33k threaded on the shaft 33b. The amount of friction is determined by the setting of the spring 33l, and the movable member 33c is prevented from rotation but permitted longitudinal movement during rotation of the shaft 33b by interengagement of its outer end with the post 67A. The clutch member 33b is provided with pins 33m and 33n adapted to engage pins 33o and 33p fixedly mounted on and rotatable with the shaft 33b at the terminals of travel of the movable member. By this arrangement the movable member 33c is stopped at either end of its travel by engagement of the pin 33m with the pin 33o (or 33n with 33p, as the case may be), at the end of its travel, the threaded shaft 33b then being free to rotate further, such further rotation merely causing slippage between the clutch member 33k and the movable member 33c. When the operation is reversed and the shaft 33b starts to rotate in the opposite direction the movable member 33c moves away instantly, since there was no wedging or jamming on the threads.

Referring now more particularly to Figures 7 and 8, it will be seen that the slip clutch 32 comprises a shoe 32a (of fiber or plastic, for example) encircling a drum 32b fixedly mounted on the shaft 24, held in place with the desired frictional engagement by the encircling band spring 32c. The worm gear 31, rotatable about but not directly connecting to the shaft 24, carries a pin or stud 32d lying between the two end faces of the friction shoe 32a, with a little clearance or lost motion, preferably at least one-sixteenth of an inch. Rotation of the worm gear 31 by the worm 30, therefore, transmits its force to the shaft 24 by pressure against one or the other of the end faces of the friction shoe 32a; and when the frictional grip of this shoe on the drum 32b is exceeded. the worm gear 31 can rotate without rotation of the shaft 24, slippage taking place between the shoe and the drum of this clutch. It is particularly important that the shoe action be of the "unwrapping" type, so that the friction is a function of the spring 32c and is not irregularly and undesirably increased by "servo" action, as is the case where the drive is so arranged that a friction band wraps more tightly on to its drum as it rotates it. This "unwrapping" action, together with the provision of a certain amount of play between the stud 32a and the faces of the friction shoe, prevents undesired sticking of the slip-clutch despite great changes in operating conditions, as variation through wide ranges of temperature.

The details of the single tooth ratchet are best shown in Figures 9 and 10. The driving element 36a is fixed to the worm gear 35, both being freely rotatable about the shaft 37; while the driven member 36b is fixed to the shaft 37, so that movement of the driven member effects movement of the shaft. The driving member 36a is provided with an annular slot 36c having a fixed pin 36d in one portion thereof, this pin having a sloping face; and the cooperating driven member is provided with a bore or opening 36e in which a pin 36f is longitudinally movable against the force of a spring 36g, the bore registering with the annular slot. Rotation of the driving member in one direction (its direction or rotation during the tuning portion of the cycle) brings the sloping face into engagement with the movable pin and does not effect rotation of the driven shaft; rotation in the other direction (when the parts are being driven toward home position), however, causes driving engagement between the pins and rotation of the selector drum and cams.

The construction of a particular embodiment of my invention in a single-turn unit is illustrated in Figures 12-15. Since the operation of the single-turn unit has been described at some length in connection with the lower portion of the schematic diagram in Figure 1, and since the reference numerals applied to various parts in this unit correspond with similar parts in the multi-turn unit, it is believed that very little description of this unit will be necessary. Again the unit is a self-contained one, mounted between end plates 265 and 266 held in proper relationship to each other by the posts 267; the stop ring drum carries a plurality of tuning stop rings, here identified as 227A—K, and a terminal stop ring 229, these cooperating with the appropriate portions of the tuning pawls 247A—K and the terminal stop pawl 249; and selection of the particular stop combination desired is made by positioning of the selector cam drum by operation of the selector switch. In both the single-turn and the multi-turn units twelve cams are shown, with their slots regularly spaced at 30°; but it will be understood that the number of stop combinations may be anything desired within reasonable limits, and that the spacings of the selector cam slots would be arranged in accordance with the number of pawls to be selected. It will be noted that the lost motion connection between the shaft 237 and the rotatable portion of the selector switch 262 is effected by engagement of the pin 260a with one side of an arm 261, this latter element being on the same shaft as the rotatable portion of the selector switch.

The sequence control circuit is illustrated in Figure 16, to which reference is now made. It will be understood that the reversible motor 20 and the various relays and circuits may be energized from any conventional appropriate source of power, here illustrated as the battery 101. The main or motor control relay, here identified in general as 102, has an actuating coil 102a, three movable switch members 102b—d, three "upper" contacts 102c—g, and three "lower" contacts 102h—j. As will be more fully described after reference to some of the other parts of the circuit, this motor control relay, in combination with the limit switch 33, achieves the desired sequence of operations.

A manual selector switch, here identified in general as 103, is shown as having twelve switch taps 103a—l wired to the corresponding switch points 263a—l of the selector switch mounted on the single-turn unit. The switch 103 is provided with a manually movable switch arm 103m adapted to engage any selected one of the twelve switch points, each switch point selecting a different pawl in the operating mechanism (eleven automatic tuning pawls and one manual tuning pawl). The local-remote switch 104 is provided so that the selection of the circuit setting may be made by the manual switch shown or by another switch at a remote point connected through appropriate wiring to the contact 104a, this remote switch being either a similar tap switch, a telephone dial type switch, or any appropriate means. A relay 105, here shown as having an operating coil 105a and movable switch elements 105b and 105c cooperating with fixed contacts 105d and 105e, provides, in combination with the carrier control switch 106, an inter-locking arrangement such that automatic tuning may not be effected when the transmitter carrier is on. The switch elements 106a and 106b may be part of a keying relay, and the contacts 106b and 105d may control other parts of the circuit.

Assuming that the parts are as shown in Figures 4–15 of the drawings, and that it is desired to select another frequency setting, movement of the switch arm 103m might be made up to the contact 103k, as shown in dotted line position, which would select a stop combination two removed from that shown in operative position in Figures 4–15. This movement of the switch arm would complete a circuit from ground through the selector switch disc 262a, the contact 263k, the wire 107, the manual switch contact 103k, the switch arm 103m, the wire 108, the switch 104, the contacts 105c and 105e (it being assumed that the carrier control switch 106 is open), the wire 109, the operating coil 102a of the motor relay, the wire 110, the battery 101, and the wire 111 back to ground. Completion of this circuit energizes the motor control relay and causes its movable switch elements 102b, 102c and 102d to move from their normal position as illustrated to the lower position. Thereupon the armature of the motor 20 is energized by a circuit starting from the upper end of the battery, through the wire 110, the contacts 102c and 102i, the motor armature, the contacts 102b and 102h, and the wire 111 to the lower end of the battery. This causes the motor 20 to start rotating the shafts and tuning units in the homing direction, the ratchets picking up the selector cam drums and the first few degrees of revolution of these lifting the pawls 47B and 247B and permitting free rotation of all of the shafts. At the same time the movable member of the limit switch 33 begins to travel downward (speaking with respect to the position shown in Figure 16) and 33d makes contact with 33e and immediately breaks its contacts with 33f, disabling the carrier switch 106 until the tuning cycle is completed. The selector switch disc 262a is, of course, rotating during the rotation of the parts to home position, but intermittent breaking of the circuit at the contact 263k has no effect on the motor control relay, because once it has been energized it provides its own holding circuit through the limit switch contacts 33g and 33h and the relay contacts 102d and 102j.

The limit switch 33 is so constructed and arranged that the motor remains in operation until all of the various tuning parts have reached home position, these reaching such position at various times and their respective clutches thereafter slipping until the main shaft has gone through a number of revolutions sufficient to insure that all parts have reached home position from their farthest position therefrom. At this time the movable member 33c of the limit switch 33 reaches the lower end of its travel and opens the holding circuit contacts 33g and 33h. It will be noted that this does not instantly deenergize the motor control relay 102, however, as its own holding circuit and the energizing circuit through the selector switch 262 are in parallel. As soon as the selector switch reaches a position with the slot of its movable member opposite the contact 263k, however, the motor control relay circuit is deenergized and the motor stops, leaving the various selector drums in such position that the stop combinations corresponding to the setting of the manual control 103 are selected.

Deenergization of the motor relay coil 102a causes the relay to return to the position shown in Figure 16, whereupon reverse rotation of the motor 20 is initiated, the circuit in this case being from the upper part of the battery through the wire 110, the contacts 102c and 102f, the wire 112, the contacts 33d and 33e, the wire 113, the contacts 102b and 102e, the motor armature, the contacts 102d and 102g, the wire 111 at the bottom of the battery. It will be noted that when the motor control relay was energized the upper end of the battery was connected to the upper end of the armature, but that now this connection is reversed.

Thereupon the various tuning unit parts start rotating in the tuning direction, each tuning shaft being stopped in its appropriate position by engagement of its respective pawl with the forward shoulder of its stop ring slot, as was fully described earlier in connection with the schematic diagram, the clutch thereafter slipping to permit the main and line shafts to continue rotation to terminal position. This rotation continues until the limit switch member 33c opens the contacts 33d and 33e, this stopping the motor and completing the cycle of operation. It will be noted that the contacts 33d and 33e are bridged by a resistor 114, this providing a very low current through the motor armature even when these contacts are open, just enough to keep the pawls in firm engagement with the forward shoulders of their respective cooperating stop rings. That is, this resistance provides a motor torque insufficient to overcome the frictional resistance of the slip-clutches, but sufficient to prevent the tuned elements from vibrating out of the selected positions.

This sequence of operations is illustrated in abbreviated form in Figure 17, and reference may be had to that figure for quick reference as to some particular portion of the automatic tuning cycle. Completion of the cycle recloses the contacts 33e and 33f, so that the carrier control switch 106 may again be operated to transmit on the newly selected frequency. A system of the type here disclosed enables a radio circuit to be conveniently set up for a number of previously chosen frequencies, and to thereafter be automatically tuned from one to another of such frequencies in a matter of seconds by mere movement of the control switch 103.

The claims submitted hereafter are directed to various combinations and subcombinations of the elements of the invention disclosed herewith. Improvements in the separate and divisible portions of the mechanism are the subject matter of other patents issued on co-pending applications of myself and one Richard W. May identified as Collins U. S. Patent No. 2,409,192, dated October 15, 1946, May U. S. Patent No. 2,391,470, dated December 25, 1945, and May U. S. Patent No. 2,378,941, dated June 26, 1945, improvements disclosed but not claimed here being claimed in such other patents.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. Apparatus of the character described for positioning a rotatable shaft, including: means adapted to rotate the shaft through a plurality of revolutions; a plurality of means for stopping the shaft at a predetermined point in each revolution, each such means being adapted to stop the shaft at a different point and being normally inoperative; an equal number of turn determining means, each such means being operatively associated with one of the stopping means and rendering it effective in a predetermined revolution; and selecting means for rendering operative a desired one of said stop means and its associated turn determining means.

2. Apparatus of the character described for positioning a rotatable shaft, including: means adapted to rotate the shaft through a plurality of revolutions; a plurality of stop combinations, each such combination including a stop ring mounted on and rotatable with said shaft, said ring having a stop shoulder, and a pawl adapted to have one portion move into stopping engagement with said shoulder; primary cam means for selecting the stop combination to be operative; and secondary cam means for determining the turn of said shaft in which the selected stop combination will be operative.

3. Apparatus of the character claimed in claim 2, wherein there is a secondary cam associated with each stop combination and wherein said secondary cams are mounted on a shaft driven at a reduced rate but in fixed relationship to the first-mentioned shaft.

4. Apparatus of the character described for positioning a rotatable shaft, including: reversible drive means adapted to rotate the shaft through a plurality of revolutions; a plurality of stop combinations, each such combination including a stop ring mounted on and rotatable with said shaft, said ring having a stop shoulder, and a pawl adapted to have one portion move into stopping engagement with said shoulder; primary cam means for selecting the stop combination to be operative; means for causing the drive means to rotate said shaft in one direction until a terminal position has been reached and the primary cam means has rendered the desired stop combination operative; means for causing the drive means to rotate said shaft in the other direction; and secondary cam means for keeping the selected stop combination ineffective until a predetermined revolution of the shaft and for rendering it effective in such revolution.

5. Apparatus of the character described for positioning two rotatable shafts, including: a first unit connected to one shaft and adapted to rotate it through a plurality of revolutions, this unit including means for stopping the shaft at a predetermined point anywhere in said range of rotation; a second unit connected to the other shaft and adapted to rotate it through a range not exceeding a single revolution, this unit including means for stopping the shaft at a predetermined point in said range of rotation; a single drive means making driving connection to both said units; and means in said connections whereby either shaft can stop at its predetermined position while the drive means continues operation.

6. Apparatus of the character claimed in claim 5, including limit means for terminating the operation of the drive means.

7. Apparatus of the character described for positioning two rotatable shafts, including: a first unit connected to one shaft and adapted to rotate it through a plurality of revolutions, this unit including a plurality of stop combinations, each such combination being adapted to stop the shaft at a predetermined point anywhere in said range of rotation, and selecting means for rendering operative a desired one of said stop combinations; a second unit connected to the other shaft and adapted to rotate it through a range not exceeding a single revolution, this unit including a plurality of stop combinations, each such combination being adapted to stop the shaft at a predetermined point in said range of rotation, and selecting means for rendering operative a desired one of said stop combinations; a single drive means; a single selector switch; and means operative upon each positioning cycle of operations for automatically synchronizing the selecting means in each unit with said selector switch.

8. Apparatus of the character claimed in claim 7, wherein the last mentioned means includes a single-tooth ratchet in each unit.

9. Apparatus of the character described for positioning two rotatable shafts, including: a first unit connected to one shaft and adapted to rotate it through a plurality of revolutions, this unit including a plurality of stop combinations, each such combination being adapted to stop the shaft at a predetermined point anywhere in said range of rotation, and selector cams for rendering operative a desired one of said stop combinations; a second unit connected to the other shaft and adapted to rotate it through a range not exceeding a single revolution, this unit including a plurality of stop combinations, each such combination being adapted to stop the shaft at a predetermined point in said range of rotation, and selector cams for rendering operative a desired one of said stop combinations; a single drive means making driving connection to both said units; a single selector switch; a single-tooth ratchet in each unit for synchronizing the selector cams with said selector switch; means in said driving connections whereby either shaft can stop at its predetermined position while the drive means continues operation; and a single limit means for terminating the operation of the drive means.

10. Apparatus of the character described for positioning two rotatable shafts, including: a first unit connected to one shaft and adapted to rotate it through a plurality of revolutions, this unit including a plurality of stop combinations, each such combination being adapted to stop the shaft at a predetermined point anywhere in said range of rotation, and selector cams for rendering operative a desired one of said stop combinations; a second unit connected to the other shaft and adapted to rotate it through a range not exceeding a single revolution, this unit including a plurality of stop combinations, each such combination being adapted to stop the shaft at a predetermined point in said range of rotation, and selector cams for rendering operative a desired one of said stop combinations; a single drive means making driving connection to both said units; and gearing so arranged that the selector cams rotate at the same rate, but the first-mentioned shaft rotates more rapidly than said other shaft.

11. Apparatus of the character claimed in claim 9, including gearing so arranged that the selector cams rotate at the same rate, but the first-mentioned shaft rotates more rapidly than said other shaft.

12. Apparatus of the character described for positioning a rotatable shaft, including: means adapted to rotate the shaft; a plurality of mechanical stop combinations, each such combination being adapted to automatically stop the shaft at a predetermined point in the range of rotation; a substantially similar mechanical combination adapted to leave the shaft free for manual tuning; and selecting means for rendering operative a desired one of said combinations.

13. Apparatus of the character described for positioning a rotatable shaft, including: means adapted to rotate the shaft; a plurality of mechanical stop combinations, each such combination including a ring member having a shoulder thereon, said ring member being rotatable with the shaft, and a movable stop element adapted to move into stopping engagement with said shoulder; another mechanical combination including a ring member and another movable element adapted to engage said last mentioned ring member while leaving the shaft free for manual tuning; and selecting means for moving a desired element, said means including a cam associated with each element.

14. Apparatus of the character described for automatically positioning a rotatable shaft having a portion projecting through a panel of a cabinet and having a manually-operable tuning dial thereon, at least such portion being hollow, including: a drum on said shaft within said cabinet; a plurality of stop rings rotatably and axially movable on said drum, each such ring having a generally radial stop shoulder; a plurality of spacer rings intermediate said stop rings, the spacer rings being non-rotatably but axially movable on said drum; a plurality of stop elements adapted to make stopping engagement with the stop rings; a clamping member non-rotatably but axially movable on said drum for clamping the stop rings to the drum or releasing them therefrom; means operable from without said cabinet for rendering a selected stop element operative; and means for moving said clamping member, said means having an operating portion including a second shaft threaded within said hollow portion and extending through said dial on the outside of said panel, whereby setting of the stopping position of the shaft for each member may be made from without the cabinet.

15. Apparatus of the character described for positioning a rotatable shaft having a portion projecting through a panel of a cabinet, including: means for driving said shaft through a plurality of revolutions; a second shaft driven at reduced speed by said first shaft; a stop member mounted on said first shaft; a stop element adapted to make stopping engagement with said member; a cam on said second shaft for determining in which revolution of the first shaft said stopping engagement is made, said cam being spring-held on said second shaft; and locking means adapted selectively to prevent or permit movement of said members with respect to said first shaft, said locking means having an operating portion on the opposite side of said panel from said members and elements.

16. Apparatus of the character claimed in claim 14, wherein said shaft is adapted to be rotated through a plurality of revolutions, and wherein there is a cam drum driven at reduced speed by said shaft, a plurality of cams on said cam drum for determining in which revolution of the shaft stopping engagement is made, and spring means for normally maintaining said cams in a desired position on said drum but permitting movement with respect thereto when the stopping position is being set.

17. Apparatus of the character claimed in claim 4, wherein said stop rings are releasably locked on said shaft and the secondary cam means comprises cams spring-held on a drum driven at reduced speed by said shaft.

18. Apparatus of the character described for positioning a rotatable shaft, including: a stop member mounted on said shaft; a stop element adapted to make stopping engagement with said member; a cam having a slot therein adapted to receive a portion of said element; drive means for rotating said cam; a second cam operable on a different portion of said element for positively lifting said first-mentioned portion out of the slot; and means for rotating said second cam from the said drive means at a reduced speed relative to said first cam.

19. Apparatus of the character described for positioning a rotatable shaft, including: a stop member mounted on said shaft; a stop element adapted to make mechanical stopping engagement with said member; a reversible motor for rotating said shaft; and means whereby said motor maintains said member in contact with said element with a predetermined minimum force after stopping engagement has been effected.

20. Apparatus of the character described for positioning a rotatable shaft, including: a stop member mounted on said shaft; a stop element adapted to make stopping engagement with said member; a reversible motor for rotating said shaft; a slip-clutch between said motor and shaft; and means whereby said motor maintains said member in contact with said element, after stopping has been effected, with a force less than that required to slip the clutch.

21. An electrical control system comprising in combination a single reversible drive system, means for initiating said reversible drive system in operation, independently controlled units operated by said reversible drive system, each of said controlled units operating an independently arranged angularly adjustable device, means in one of said controlled units operative upon reversal of drive thereof for selectively positioning the associated angularly adjustable device within limits of one revolution of said controlled units, and means in another of said controlled units for selectively positioning the angularly adjustable device associated therewith within limits of a multiplicity of revolutions of said angularly adjustable device.

22. Shaft positioning apparatus comprising a reversible driving motor, gears driven by said motor, a stop-ring drum assembly, a slip clutch between one of said gears and said stop-ring drum assembly, a cam drum shaft assembly, a connection between another of said gears and said cam drum shaft assembly, a pawl shaft assembly associated with said stop-ring drum assembly and said cam drum assembly, a shaft to be positioned connected with said stop-ring drum assembly, means for effecting a reversal in direction of movement of said driving motor for effecting a selection of the angular position of said shaft to be positioned, a counter drum, gearing interconnecting said counter drum with said stop-ring drum assembly, and means for arresting the movement of said driving motor after a predetermined lapse of time subsequent to said shaft positioning operation.

23. Shaft positioning apparatus comprising a reversible driving motor, gears driven by said motor, a stop-ring drum assembly, a slip clutch between one of said gears and said stop-ring drum assembly, a cam drum shaft assembly, a connection between another of said gears and said cam drum shaft assembly, a pawl shaft assembly associated with said stop-ring drum assembly and said cam drum assembly, a shaft to be positioned connected with said stop-ring drum assembly, a counter drum driven in cooperation with said stop-ring drum assembly, a pawl having extensions thereof coacting with said stop-ring drum, cam drum and said counter drum, means for effecting a reversal in direction of movement of said driving motor for effecting a selection of the angular position of said shaft to be positioned, and means for arresting the movement of said driving motor after a predetermined lapse of time subsequent to said shaft positioning operation.

24. Shaft positioning apparatus comprising in combination a shaft to be positioned, a stop-ring drum assembly connected with the shaft to be positioned, a cam drum assembly, a counter drum, a series of pawls disposed between said stop-ring drum assembly, said cam drum assembly, and said counter drum, each pawl being individually actuated by a separate cam for engagement with a corresponding individual stop-ring, means for imparting movement to said cam drum assembly and said stop-ring drum assembly, and said counter drum in a predetermined sequence of operations for actuating a selected pawl and for moving the corresponding stop-ring into engagement therewith for setting said shaft in a desired angular position, and a limit switch drive geared to said system for controlling the circuit to said driving motor.

25. An electrical control system comprising a single reversible motor, a drive system driven by said motor, means for selectively initiating said motor in operation, controlled units independently driven by said drive system, angularly shiftable control devices actuated by said controlled units, manual means for initially adjusting the position of said controlled units, means in one of said controlled units for arresting the operation thereof within limits of one revolution, means in another of said controlled units for arresting the operation thereof within limits of a multiplicity of revolutions for correspondingly adjusting the position of said angularly shiftable control devices, and means in said last mentioned controlled units for indicating the number of revolutions thereof.

26. Means for controlling wide band angular motion comprising in combination, a stop-ring drum shaft, a connection between a shaft to be positioned and said stop-ring drum shaft, a multiplicity of stop-rings carried by said stop-ring drum shaft, a calibrated setting dial carried by said stop-ring drum shaft, a cam drum, a counter drum, intermediate pawls for effecting selection of a predetermined stop-ring, and an indicator dial disposed in the plane of said calibrated dial and connected with said counter drum for indicating the angular movement of said shaft to be positioned.

27. Means for controlling wide band angular motion comprising in combination, a stop-ring drum shaft, a connection between a shaft to be positioned and said stop-ring drum shaft, a multiplicity of stop-rings carried by said stop-ring drum shaft, a calibrated setting dial carried by said stop-ring drum shaft, a cam drum, a counter drum, intermediate pawls for effecting selection of a predetermined stop-ring, a reversible driving motor, and a control switch driven in coaction with said system for controlling at predetermined limits over a predetermined time interval the operation of said motor.

28. Apparatus of the character described for positioning a rotatable shaft, including: reversible drive means adapted, upon initiation of a positioning cycle, to rotate said shaft in a first direction to a home position and thereafter to rotate said shaft in the opposite direction; a ring member, said ring having in the periphery thereof a slot defined by two substantially radial edges; a stop element having a portion adapted to be received by said slot; and means operable upon the stop element, upon initiation of rotation of said shaft in said first direction, for positively lifting said portion out of said slot.

29. Apparatus of the character described for positioning a rotatable shaft, including: reversible drive means adapted, upon initiation of a positioning cycle, to rotate said shaft in a first direction to a home position and thereafter to rotate said shaft in the opposite direction; a plurality of coaxial ring members rotated by rotation of said shaft, each such ring member having in the periphery thereof a slot defined by two substantially radial edges; a plurality of stop elements, each element cooperating with one of the ring members and having a portion adapted to be received by the slot therein when such positioning combination is operative; means for selecting the positioning combination to be operable; and means operable upon the stop element of the combination previously rendered operable, upon initiation of rotation of said shaft in said first direction, for positively lifting said portion out of said slot.

30. Apparatus of the character described for automatically positioning a rotatable shaft having a portion projecting through a panel of a cabinet and having a manually-operable tuning dial thereon, at least the portion of the shaft projecting through the panel being hollow, including: a plurality of stop members mounted on said shaft within said cabinet; a plurality of stop elements within said cabinet adapted to make stopping engagement with said members; a pressure member slidable on said shaft within said cabinet and adapted to exert force against said members; means operable from without said cabinet for rendering a selected stop element operative; and locking means adapted selectively to prevent or permit movement of said members with respect to the shaft, said locking means having an operating portion extending on the outside of said panel and a portion adapted to engage said pressure member, said operating portion including a second shaft threaded within the hollow portion of the first mentioned shaft and extending through said dial, whereby setting of the stopping position of the shaft for each member may be made from without the cabinet.

ARTHUR A. COLLINS.

REFERENCES CITED

The following references are of record in the file of this patent:

UNITED STATES PATENTS

| Number | Name | Date |
|---|---|---|
| 788,327 | Nelson | Apr. 25, 1905 |
| 1,163,362 | Poche | Dec. 7, 1915 |
| 1,795,420 | Beall | Mar. 10, 1931 |
| 2,046,304 | Brubaker | June 30, 1936 |
| 2,130,153 | Plensler | Sept. 13, 1938 |
| 2,150,362 | Collins | Mar. 14, 1939 |
| 2,164,309 | Collins | July 4, 1939 |
| 2,165,226 | Collins | July 11, 1939 |
| 2,167,850 | Phillips | Aug. 1, 1939 |
| 2,174,552 | Collins | Oct. 3, 1939 |
| 2,179,748 | Mastney | Nov. 14, 1939 |
| 2,180,740 | Kaye | Nov. 21, 1939 |
| 2,191,137 | Trible | Feb. 20, 1940 |
| 2,192,706 | Good et al. | Mar. 5, 1940 |
| 2,197,312 | Nelson | Apr. 16, 1940 |
| 2,231,156 | Claytor | Feb. 11, 1941 |
| 2,249,753 | Elliott | July 22, 1941 |
| 2,285,414 | Collins | June 9, 1942 |
| 2,288,098 | Marholz et al. | June 30, 1942 |
| 2,292,145 | Mercereau | Aug. 4, 1942 |
| 2,299,082 | Elliott | Oct. 20, 1942 |
| 2,306,739 | Maier | Dec. 29, 1942 |
| 2,316,776 | Elliott | Apr. 20, 1943 |
| 2,320,867 | Hill | June 1, 1943 |
| 2,334,724 | Paessler | Nov. 23, 1943 |
| 2,343,540 | Elliott | Mar. 7, 1944 |
| 2,411,617 | Elliott | Nov. 26, 1946 |
| 2,419,367 | Randolph | Apr. 22, 1947 |

FOREIGN PATENTS

| Number | Country | Date |
|---|---|---|
| 453,892 | Germany | June 6, 1926 |
| 865,507 | France | May 26, 1941 |